United States Patent
Pfahl et al.

(10) Patent No.: US 8,651,100 B2
(45) Date of Patent: Feb. 18, 2014

(54) METHOD FOR CONTROLLING THE ALIGNMENT OF A HELIOSTAT WITH RESPECT TO A RECEIVER, HELIOSTAT DEVICE AND SOLAR POWER PLANT

(75) Inventors: Andreas Pfahl, Stuedenitz-Schoenermark (DE); Reiner Buck, Stuttgart (DE); Karsten Rehschuh, Heidenheim a.d. Brenz (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 957 days.

(21) Appl. No.: 12/384,670

(22) Filed: Apr. 6, 2009

(65) Prior Publication Data

US 2009/0249787 A1 Oct. 8, 2009

Related U.S. Application Data

(63) Continuation of application No. PCT/EP2007/061920, filed on Nov. 6, 2007.

(30) Foreign Application Priority Data

Nov. 13, 2006 (DE) .......................... 10 2006 053 758

(51) Int. Cl.
*F24J 2/38* (2006.01)
*F24J 2/54* (2006.01)
*G01S 3/786* (2006.01)

(52) U.S. Cl.
USPC ............................ 126/573; 126/572; 126/600

(58) Field of Classification Search
USPC .......................................... 126/573, 572, 600
IPC ............................... F24J 2/38,2/54; G01S 3/786
See application file for complete search history.

(56) References Cited

U.S. PATENT DOCUMENTS 3,466,119 A 9/1969 Francia
3,942,879 A * 3/1976 Pledger ...................... 359/226.2

(Continued)

FOREIGN PATENT DOCUMENTS

DE 27 00 313 7/1977
DE 196 30 201 10/1997

(Continued)

OTHER PUBLICATIONS

Haeberle, et al. "Precise and Economic Sun Position Sensor", unpublished, presented by authors at public seminar in Germany, Summer of 2006, 6 pages.

(Continued)

*Primary Examiner* — Kang Hu
*Assistant Examiner* — Daniel E Namay
(74) *Attorney, Agent, or Firm* — Lipsitz & McAllister, LLC (57) ABSTRACT

A method is provided for controlling the alignment of a heliostat with respect to a receiver, wherein an image sensor device is arranged on a mirror device of the heliostat, wherein the heliostat is aligned by the image sensor device using image recognition in such a way that a first angle of a first vector pointing towards the sun, relative to a prescribed vector of the mirror device, and a second angle of a second vector pointing towards a prescribed target area of the receiver, relative to the prescribed vector, are in a relationship to each other which is dependent upon the prescribed vector of the mirror device, and wherein images of the sun and the prescribed target area and their position relative to the prescribed vector are determined.

42 Claims, 4 Drawing Sheets

(56) References Cited

U.S. PATENT DOCUMENTS

| | | | |
|---|---|---|---|
| 4,013,885 A | 3/1977 | Blitz | |
| 4,056,313 A | 11/1977 | Arbogast | |
| 4,110,010 A | 8/1978 | Hilton | |
| 4,146,784 A | 3/1979 | Yekutieli | |
| 4,149,521 A * | 4/1979 | Fletcher et al. | 126/693 |
| 4,211,922 A | 7/1980 | Vaerewyck et al. | |
| 4,242,580 A * | 12/1980 | Kaplow et al. | 250/203.4 |
| RE30,960 E | 6/1982 | Sommer | |
| 4,367,403 A * | 1/1983 | Miller | 250/203.4 |
| 4,564,275 A | 1/1986 | Stone | |
| 4,586,488 A | 5/1986 | Noto | |
| 4,999,483 A | 3/1991 | Okamoto | |
| 5,861,947 A | 1/1999 | Neumann | |
| 7,079,234 B2 * | 7/2006 | Vogel | 356/141.1 |
| 7,136,726 B2 * | 11/2006 | Greenfeld et al. | 701/3 |
| 7,190,812 B2 * | 3/2007 | Ahn | 382/107 |
| 7,207,327 B2 * | 4/2007 | Litwin et al. | 126/601 |
| 7,507,941 B2 * | 3/2009 | Yeh et al. | 250/203.4 |
| 7,994,459 B2 * | 8/2011 | Zavodny et al. | 250/203.4 |
| 2003/0045949 A1 | 3/2003 | Stone et al. | |
| 2004/0069896 A1 * | 4/2004 | de Virel | 244/3.13 |
| 2005/0274376 A1 * | 12/2005 | Litwin et al. | 126/685 |
| 2008/0164135 A1 * | 7/2008 | Slook | 202/83 |
| 2009/0229264 A1 * | 9/2009 | Gilon et al. | 60/641.8 |

FOREIGN PATENT DOCUMENTS

| | | | |
|---|---|---|---|
| DE | 197 07 461 | 8/1998 | |
| EP | 388210 A2 * | 9/1990 | F41G 7/22 |
| EP | 519773 A1 * | 12/1992 | G01S 3/786 |
| EP | 744625 A2 * | 11/1996 | G01S 3/786 |
| FR | 2 340 576 | 9/1977 | |
| GB | 2252398 A * | 8/1992 | F41H 13/00 |
| GB | 2319421 A * | 5/1998 | G01S 3/786 |
| GB | 2 329 976 | 4/1999 | |
| JP | 62008120 A * | 1/1987 | G02B 27/00 |
| JP | 02108989 A * | 4/1990 | G01S 3/786 |
| JP | 06317644 A * | 11/1994 | G01S 3/786 |
| JP | 07191124 A * | 7/1995 | G01S 3/786 |
| JP | 10170622 A * | 6/1998 | G01S 3/782 |
| JP | 11205774 A * | 7/1999 | H04N 7/18 |
| JP | 2000241542 A * | 9/2000 | G01S 13/66 |
| JP | 2004153203 A * | 5/2004 | H01L 31/42 |
| KR | 2001 0009349 | 2/2001 | |
| WO | WO 9417427 A1 * | 8/1994 | G01S 3/786 |
| WO | 02/070966 | 9/2002 | |
| WO | WO 03077359 A2 * | 9/2003 | H01Q 1/12 |
| WO | WO 2010017415 A2 * | 2/2010 | F24J 2/38 |

OTHER PUBLICATIONS

Aiuchi, et al. "Sensor-Controlled Heliostat with an Equatorial Mount", Elisevier Ltd., Solar Energy, 2006, 9 pages.

Kribus, et al. "Closed Loop Control of Heliostats", Solar PACES International Symposium, Sep. 2002, pp. 559-565.

Berenguel, et al. "An Artificial Vision-Based Control System for Automatic Heliostat Positioning Offset Correction in a Central Receiver Solar Power Plant", Elsevier Ltd., Solar Energy 76, 2004, pp. 563-575.

* cited by examiner

METHOD FOR CONTROLLING THE ALIGNMENT OF A HELIOSTAT WITH RESPECT TO A RECEIVER, HELIOSTAT DEVICE AND SOLAR POWER PLANT

This application is a continuation of international application number PCT/EP2007/061920 filed on Nov. 6, 2007.

The present disclosure relates to the subject matter disclosed in international application number PCT/EP2007/061920 of Nov. 6, 2007 and German application number 10 2006 053 758.0 of Nov. 13, 2006, which are incorporated herein by reference in their entirety and for all purposes.

BACKGROUND OF THE INVENTION

The invention relates to a method for controlling the alignment of a heliostat with respect to a receiver.

The invention further relates to a heliostat device, comprising a movable mirror device.

Furthermore, the invention relates to a solar power plant comprising at least one receiver and at least one heliostat device.

Solar power plants with a tower receiver are known, for example, from U.S. Pat. No. 4,564,275 and from U.S. Pat. No. 4,586,488.

Solar radiation is directed onto the receiver by one or more heliostats. Owing to the movement of the sun, heliostats have to track the sun.

In accordance with the present invention, a method is provided by means of which the alignment and adjustment of the mirror device of a heliostat are enabled in a simple and cost-effective way.

SUMMARY OF THE INVENTION

In an embodiment of the invention, an image sensor device is arranged on a mirror device of the heliostat, the heliostat is aligned by the image sensor device using image recognition in such a way that a first angle of a first vector pointing towards the sun, relative to a prescribed vector of the mirror device, and a second angle of a second vector pointing towards a prescribed target area of the receiver, relative to the prescribed vector, are in a relationship to each other which is dependent upon the prescribed vector of the mirror device, and images of the sun and the prescribed target area and their position relative to the prescribed vector are determined.

In the solution according to the invention, image evaluation on a two-dimensional image is used to detect whether a heliostat is correctly aligned, and, where necessary, an adjustment is made on the basis of the detection results. The image sensor device can be implemented in a simple and cost-effective way. For example, image sensor devices used in digital cameras may be used.

The coordinates of images of the sun and the prescribed target area may be used as controlled variables. There is then, for example, no necessity to determine the position of the mirror device using angle transducers.

With the method according to the invention it is also possible to bring about an adjustment of the heliostat when there is cloud coverage. Instead of a real image, a "virtual" image of the sun may be used, which is generated using an algorithm to determine the movement of the sun. Coordinates of an expected image of the sun can be generated, which can be further processed.

The target area of the receiver generates an image, and the sun generates an image. Associated with the prescribed vector is a certain pixel or a certain pixel range on the image sensor device. The number of pixels that the image of the target area is away from the pixel or pixels associated with the prescribed vector is a measure of the position of the target area of the receiver relative to the prescribed vector of the mirror device. In the same way, the number of pixels that the image of the sun is away from the pixel or pixels associated with the prescribed vector is a measure of the position of the sun relative to the prescribed vector of the mirror device. Using coordinates in the image, a simple automatic control is then possible in order to set a certain relationship of the first and second angles to the prescribed vector.

The automatic control is a control in the sense of a closed-loop control.

A simple calibration of the system is possible with the method according to the invention. The possibility of error to be taken into account in the calibration can be kept low.

The automatic control method can be performed with a high degree of precision of the control results.

In particular, it is provided that the prescribed vector of the mirror device is a normal vector to a mirror surface. The position relative to the prescribed vector can thus be determined in a simple way. For example, the prescribed vector can be constituted by a fixed point in the image which is evaluated by image recognition.

In particular, the heliostat is then so aligned that the first angle and the second angle are substantially identical in terms of their amount. A simple evaluation is thus possible. For example, it is then possible to determine from the position of a midpoint of a connecting line between the image of the sun and the image of the target area whether an adjustment is necessary or not and how, if necessary, the adjustment is to be made.

It is expedient for the image sensor device to be arranged on a mirror surface of the mirror device. The automatic control can then be carried out in a simple way. The positioning of the mirror device relative to the sun and to the target area can be determined in a simple way using the coordinates of images of the sun and the target area on the image generated by the image sensor device.

It is expedient for the image sensor device to be designed as a two-dimensional image sensor device. A two-dimensional image is then generated, which can be evaluated in a simple way by image recognition.

It is expedient for an optical imaging device to be associated with the image sensor device. It is thereby ensured that an image is generated, and the position of images of the sun and the target area can be evaluated.

It may be provided that the optical imaging device has a spectrally selective characteristic. For example, the optical imaging device has one or more spectrally selective filters for this purpose. It is thus possible for only certain wavelength ranges to be used for the image recognition. In this way, the difference between the intensity of the sunlight and the intensity of the light reflected at the target area of the receiver may possibly be reduced to a considerable degree.

In principle, it is possible for the imaging device to be constituted by a lens system. If the optical imaging device comprises at least one aperture and, in particular, is formed by an aperture, there is then no occurrence of controlling inaccuracies owing to optical errors of the lens system.

It may be provided that the optical imaging device comprises a plurality of partial imaging devices for respectively imaging a partial angle area. A certain partial imaging device is then responsible for a certain partial angle area. It is, in principle, possible to initiate which partial imaging device is active, i.e., effective. The partial imaging devices are separate sub-imaging devices of the optical imaging device. For example, a first aperture has a hole which is responsible for an image range for angles between −45° to +45°. A further partial imaging device may be provided, which is designed as aperture with two adjacent holes with an image range of, for example, −80° to −45°. This partial imaging device may comprise a deflecting optical device.

It may also be provided that a partial imaging device is designed so as to enable the image sensor device to recognize whether the partial imaging device is active or not. The partial imaging device then has certain features which the image sensor device can recognize in order to facilitate the evaluation. The features may, for example, be optical features or they may also be electronic signatures which are recognizable by a control device.

It is expedient for the image sensor device to be arranged and designed such that the sun and the prescribed target area are imaged in all relevant operating points. An automatic control of the adjustment is thus possible in all relevant operating points.

In particular, it is expedient for the image sensor device to be fixedly positioned in a central area of a mirror surface of the mirror device. This results in an optimized operating area. The slightest deformations owing to gravity and wind loads usually lie in the central area of the mirror surface.

It may be provided that one or more markings for the image recognition by the image sensor device are positioned on the receiver and/or on a heliostat field. The generation of an image of the target area by the image sensor device may thereby be improved.

The marking or markings may be formed using passive elements and/or active elements. When formed using passive elements such as, for example, bright coatings, the receiver can be designed in a correspondingly simple way. When formed using active elements such as, for example, lamps, the image recognition of the target area of the receiver may possibly be improved.

For example, the marking or markings are formed by a bright, at least partial border on the target area of the receiver. A kind of reference area is thereby provided, whereby the image recognition is facilitated. In particular, a defined image of the target area can be produced.

It is, for example, alternatively or additionally also possible for the marking or markings to be formed by one or more active light-emitting elements. For example, lamps or light-emitting diodes may be provided, which are arranged at or in the proximity of the target area of the receiver. If corresponding light-emitting elements which, in particular, emit on a narrow band, are provided, thereby resulting in the image sensor device only having to register the narrowband wavelength range, then the difference in intensity between the sunlight and the intensity of the marking can be reduced.

It is quite particularly advantageous for a first forming of an image for the sun and a second forming of an image for the receiver to be performed with the image sensor device. The different brightnesses can be taken into account by the separating of the forming of the images for the sun and the receiver.

In particular, the first forming of an image and the second forming of an image are carried out with a time interval between these. In principle, it is irrelevant which forming of an image is performed first.

It is also advantageous for the first forming of an image to be performed with a shorter exposure time than the second forming of an image. The greater brightness of the sun can thereby be taken into account.

In particular, a controlled variable is the position of the image of the sun and of the image of the target area of the receiver relative to the prescribed vector. The controlled variable is that variable which is automatically controlled. The control target is to bring the controlled variable into a certain area. In particular, the target is to bring the images of the sun and of the target area of the receiver into a certain position relative to the prescribed vector. The prescribed vector is constituted, in particular, by an image point in an image of the image sensor device. This image point may be an actual image or a virtual point determined, for example, by a calibration procedure, which is characterized by certain coordinates.

In an embodiment which is simple in terms of control technology, a controlled variable is the position of a certain point on a connecting line between an image of the sun and an image of the target area of the receiver. This certain point, which, for example, is the midpoint, can be determined in a simple way by image recognition.

In particular, the automatic control is carried out such that the certain point lies on a prescribed image curve or at a prescribed image point. An image curve or image point is to be understood as a curve or a point in the image. The automatic control is carried out such that the certain point is brought into the prescribed area.

In particular, the certain point is the midpoint of the connecting line.

The automatic control can be carried out in a simple way when the target is for the midpoint to lie substantially at the same position in the image, i.e., the mirror device is adjusted such that within the scope of the controlling accuracy the midpoint always lies at the same place in the image.

In particular, an adjustment position for the mirror device is determined from a deviation of a controlled variable from a required value. The adjustment of the mirror device can thus be carried out in a simple and quick way.

It is expedient for a non-automatic control mode to be provided, in which the position of the sun and/or a required position of the mirror device is calculated. The obscuring of the sun by clouds may prevent generation of an image of the sun by the image sensor device that can be evaluated by image recognition. In this case, it is expedient to transfer to a non-automatic control mode in which the position of the sun and/or the required position of the mirror device is calculated. In the first case, the control device generates a virtual image of the sun for the image detection. Coordinates for the image of the sun are prescribed on the basis of the calculated position of the sun. It is, for example, also possible, when clouds are passing by, for the required position of the mirror device to be calculated for the rough non-automatic control by calculating the speeds of drive motors of a drive device. It is, for example, also possible to determine the required position of the mirror device using the time of day. The non-automatic control corresponds to an open-loop control.

In particular, an image of the target area of the receiver is then determined in the non-automatic control mode, and the calculated position of the sun and/or required position for the mirror device is used for the adjustment of the mirror device. The controlled variable is then adjusted using the calculated position of the sun and the detected image of the target area of the receiver.

It is expedient for the intensity and/or contour of an image of the sun to be measured in order to check whether the automatic control of the alignment of the mirror device is possible using the image of the sun. It can thereby be ascertained in a simple way whether the sun signal supplied by the image sensor device is sufficient to perform an automatic control using the image. If this is not the case it is possible to transfer to a non-automatic control mode in which a virtual image is generated by calculation of the position of the sun.

It is expedient for a calibration procedure to be provided, in which the coordinates of an image associated with the prescribed vector of the mirror device are determined. This image need not be a real image. In the calibration procedure, coordinates for the prescribed vector are determined, which can be taken into account in the image recognition and image evaluation.

In accordance with the invention, a heliostat device is provided, in which the mirror device can track the sun in a simple way.

In an embodiment of the invention, an image sensor device is provided, which is arranged on the mirror device, and a control device is provided, and the mirror device is alignable by the image sensor device and the control device using image recognition of an image of the sun and an image of a target area of a receiver.

In particular, the method according to the invention can be performed with the heliostat device according to the invention.

Advantages of the heliostat device according to the invention have been explained hereinabove in conjunction with the method according to the invention.

Advantageous embodiments of the heliostat device according to the invention have also been explained hereinabove in conjunction with the method according to the invention.

It is expedient for the mirror device to be rotatable about at least two axes. An optimal alignment and adjustment of the mirror device is thereby enabled.

It is also expedient for a drive device to be provided for moving the mirror device. In particular, the alignment can thereby be performed in an automated manner.

It is quite particularly advantageous for the image sensor device to be designed as a two-dimensional image sensor device. The image sensor device then provides a two-dimensional image which can be evaluated in a simple way. In particular, the coordinates of an image of the sun and an image of a target area of a receiver can be detected in a simple way and, in particular, determined in relation to a certain point in the image which, for example, is defined by a prescribed vector of the mirror device.

It is expedient for the image sensor device to have a normal direction which is parallel to a normal direction of a mirror surface of the mirror device. The lesser the inclination of the position of the image sensor device in relation to the mirror surface, the easier it is to perform an automatic controlling method for the alignment.

It is quite particularly advantageous for an optical imaging device to be associated with the image sensor device for generating images of the sun and a target area of the receiver.

It may be expedient for the optical imaging device to have a spectrally selective characteristic. For example, the optical imaging device has one or more spectrally selective filters. It is thus possible to use only certain wavelength ranges; if, for example, filters are correspondingly designed, the difference between the intensity of the sunlight and the intensity of the light emanating from the target area of the receiver can thereby be reduced.

In an expedient embodiment, the optical imaging device has at least one aperture or is formed by an aperture. Optical errors of a lens system are thereby eliminated, so that a simple and precise automatic control of the alignment of the mirror device is possible.

It may be provided that the optical imaging device has a plurality of partial imaging devices for respectively forming images of partial angle areas. An optimized adaptation is thus possible. The image recognition can be optimized by optimized imaging conditions being created for certain angle areas.

It is quite particularly advantageous for the image sensor device to be arranged and designed so as to enable images of the sun and the prescribed target area of the receiver to be formed in all relevant operating points. A precise automatic control of the alignment and adjustment of the mirror device is thereby obtained.

It is then expedient for the image sensor device to be fixedly positioned in a central area of a mirror surface of the mirror device. A large area can thereby be detected in a simple way. The deformations of the mirror device owing to gravity and wind loads are smallest in the central area.

It is quite particularly advantageous for the control device to include an image recognition device. The, in particular, two-dimensional, images provided by the image sensor device can be evaluated by it. The coordinates of images of the sun and a target area of the receiver and their position relative to a prescribed point can be determined.

It is also expedient for the control device to include a device for calculating the position of the sun and/or a required position for the mirror device. A virtual image of the sun can thereby be generated even when the sun is obscured by clouds, and a simple adjustment of the mirror device is, therefore, possible even when the sun is covered by clouds. For example, it is possible for the position of the sun to be calculated from known algorithms relating to the movement of the sun. It is also possible for the required position for the mirror device to be calculated using the time of day or to be determined by calculating the speed of drive motors of a drive device for moving the mirror device.

It is also expedient for the control device to include a device for controlling an imaging time of the sun and the target area of the receiver. The device for controlling an imaging time allows the different brightness of the sun and the target area to be taken into account. The image evaluation can thereby be improved as optimized images of the sun and the target area can be respectively generated by the image evaluation.

In accordance with the invention, a solar power plant is provided, in which the directing of the solar radiation onto the at least one receiver is optimizable in a simple way.

In an embodiment of the invention, the at least one heliostat device is designed in accordance with the invention.

The solar power plant according to the invention has the advantages explained hereinabove in conjunction with the heliostat device according to the invention.

It is expedient for the at least one receiver and/or a heliostat field to comprise one or more markings for the image recognition by the image sensor device on the at least one heliostat device. The image recognition for the image of a target area of the receiver, which is generated by the image sensor device, is thereby improved.

The marking or markings are, for example, formed by a bright, at least partial border on a target area of the receiver.

It is also expedient for the at least one receiver to have one or more markings for a calibration of the heliostat device. The marking or markings are, for example, arranged in a separate calibration target area of the receiver. For example, the position of a focal spot on the calibration target area can thereby be determined in a simple way in order to facilitate the calibration.

It is expedient for the at least one receiver to be a tower receiver. It is thus possible in a simple way to direct the solar radiation reflected by the at least one heliostat device onto the receiver.

The following description of preferred embodiments serves in conjunction with the drawings to explain the invention in greater detail.

BRIEF DESCRIPTION OF THE DRAWINGS

FIGS. 4(a), (b), (c) show diagrammatically different pictures (images of sun, target area of a receiver and a reference point) for different situations.

DETAILED DESCRIPTION OF THE INVENTION

Figure 1:
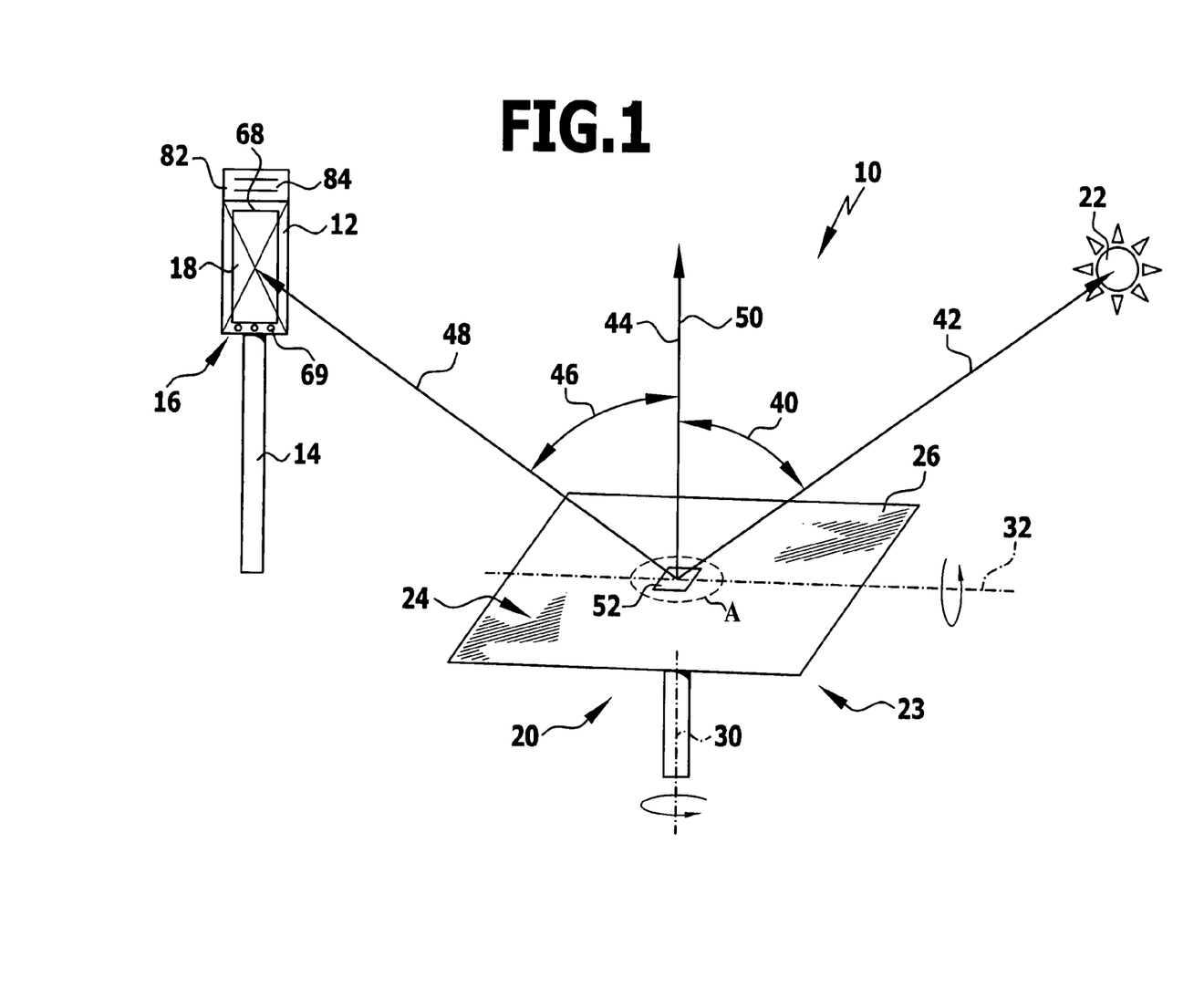
FIG. 1 shows a diagrammatic representation of an embodiment of a solar power plant with a receiver and a heliostat device.

An embodiment of a solar power plant shown diagrammatically in a partial representation and designated 10 in FIG. 1 comprises (at least) one receiver 12 which, for example, is arranged on a tower 14 and is designed as tower receiver 16. The receiver 12 has a target area 18 onto which solar radiation is to be directed. A medium is heated by solar radiation at the target area 18.

The solar plant 10 further comprises a plurality of heliostat devices 20. The heliostat devices 20 are arranged, in particular, in a heliostat field. Solar radiation coming from the sun 22 is directed by these onto the receiver 12.

A heliostat device 20 comprises a heliostat 23 with a mirror device 24. The mirror device 24 has a mirror surface 26 which is, for example, slightly spherically or parabolically curved.

The solar radiation is directed by the mirror surface 26 onto the target area 18. If a plurality of heliostats 23 with corresponding mirror surfaces 26 are present, and these direct the solar radiation onto the same target area 18, then a correspondingly high radiation flux density prevails there. Owing to the movement of the sun, the mirror devices 24 of the heliostats 23 must be adjusted in order to be able to "permanently" direct the solar radiation onto the target area 18 during sunshine hours.

Figure 3:
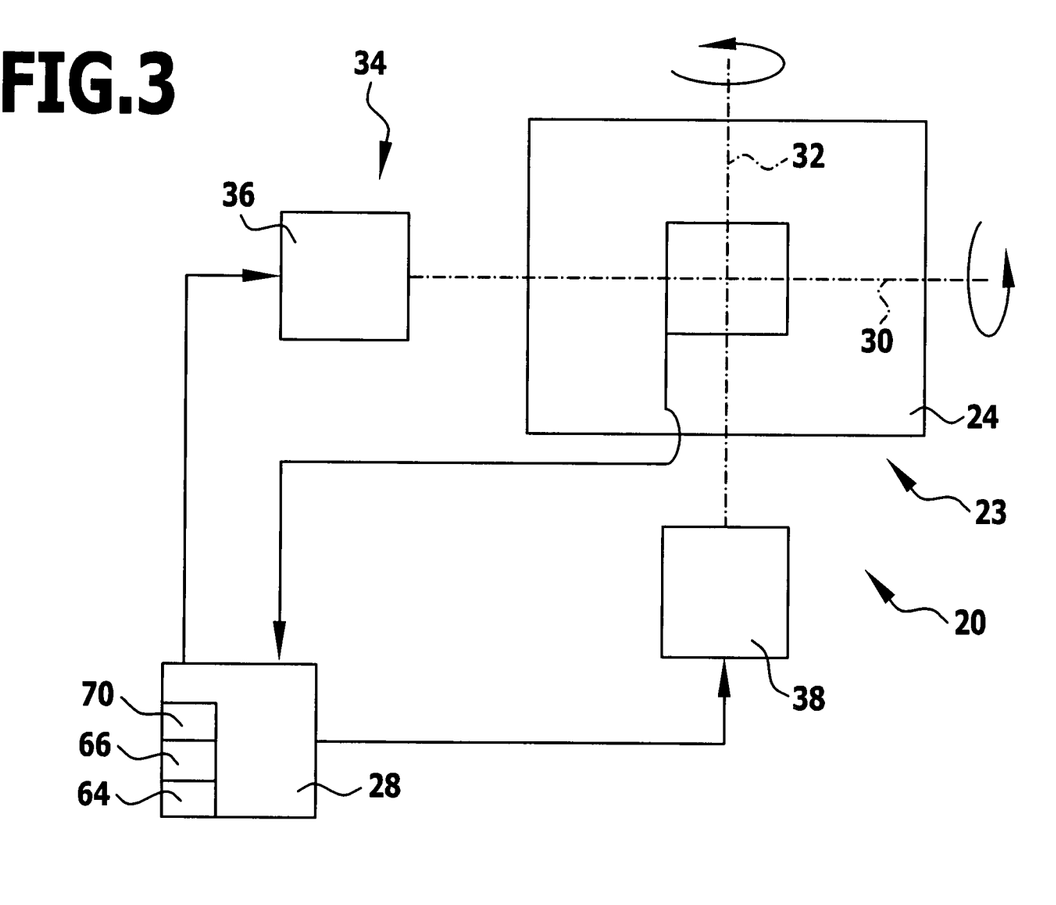
FIG. 3 shows a block circuit diagram of an embodiment of a heliostat device according to the invention.

For this purpose, the heliostat device 20 comprises a control device 28 (FIG. 3). The mirror device 24 is movable about at least two axes 30, 32, to enable adjustment. In particular, the mirror device 24 is rotatable or pivotable about these axes 30, 32 at least through a partial angle of 360°. The heliostat device 20 comprises for this purpose a drive device 34, for example, with a first drive motor 36 associated with the axis 30, and a second drive motor 38 associated with the axis 32. The control device 28 actuates the drive device 34 to align and adjust the mirror device 24 of a heliostat 23.

It is possible for each heliostat 23 to have a control device 28 of its own associated with it, or for several heliostats 23 to have a common control device 28 associated with them.

The mirror device 24 with its mirror surface 26 has to be aligned such that a first angle 40 lying between a first vector 42 pointing from the mirror surface 26 towards the sun 22 and a prescribed vector 44 of the mirror device 24, and a second angle 46 lying between the vector 44 and a second vector 48 pointing from the mirror device 24 towards the target area 18 are in a certain prescribed relationship to each other. If the prescribed vector 44 is a normal vector 50 of the mirror surface 26, then the mirror device 24 has to be aligned such that the first angle 40 and the second angle 46 are identical with respect to their amount. (The first vector 42, the prescribed vector 44 and the second vector 48 proceed from a common point on the mirror surface 26.)

Arranged on the mirror device 24 is an image sensor device 52. This is of two-dimensional design, so that a two-dimensional image is supplied. It is designed such that image recognition procedures or image evaluation procedures are possible. The image sensor device 52 comprises, for example, a commercially available digital camera chip such as a CCD chip or CMOS chip.

The image sensor device 52 is arranged with surface-to-surface contact on the mirror device 24. In particular, it lies in a central area, with the starting point of the vectors 42, 44 and 48 lying on the image sensor device 52. A normal of the image sensor device 52 is parallel to the normal vector 50. The image sensor device 52 is preferably aligned parallel to the mirror surface 26. Where necessary, an inclined position must be corrected during the control.

The image sensor device 52 is arranged and designed such that in all relevant operating positions of the heliostat 23, images of the sun 22 and of the prescribed target area 18 on the receiver 12 are formed.

Figure 2:
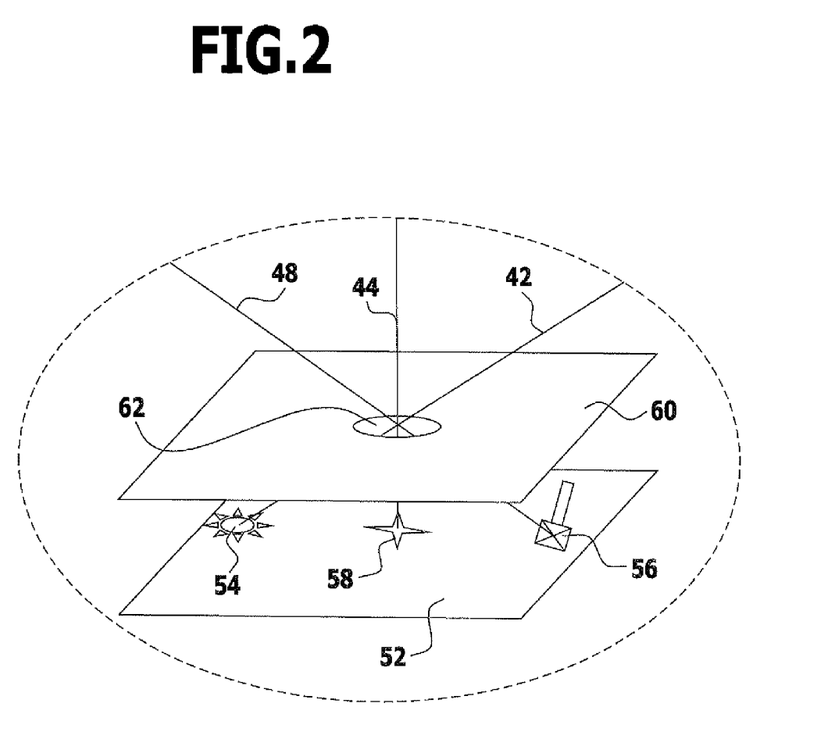
FIG. 2 shows an enlarged representation of area A according to FIG. 1.

FIG. 2 shows diagrammatically an image 54 of the sun 22 and an image 56 of the target area 18 of the receiver 12, which are supplied by the image sensor device 52. An image 58 of the prescribed vector 44 is also shown diagrammatically.

Associated with the image sensor device 52 is an optical imaging device 60. This lies in front of the image sensor device 52, i.e., the image sensor device 52 lies between the optical imaging device 60 and the mirror device 24. The optical imaging device 60 enables imaging of the sun 22 and the target area 18 on the image sensor device 52. The optical imaging device 60 comprises, for example, a lens system.

It may be provided that the optical imaging device 60 comprises (at least) one aperture 62. This has the advantage that the optical imaging device 60 then has no optical errors, as, for example, a lens system may have.

The optical imaging device 60 may be designed such that different partial angle areas can be imaged differently onto the optical imaging device. For this purpose, the optical imaging device comprises a plurality of separate partial imaging devices, with one partial imaging device being respectively effective for a certain partial angle area. In particular, the different partial imaging devices are then individually activatable, so that the respectively effective partial imaging device is adjustable.

It may be provided that the respective partial imaging devices are designed such that it is recognizable from the image sensor device or the image evaluation which partial imaging device is respectively active. For example, the respectively active partial imaging device supplies an optical signal. It is also possible for an electronic signal to be supplied.

It may be provided that the optical imaging device 60 comprises one or more spectrally selective elements such as filters. The optical imaging device 60 therefore has a spectrally selective characteristic. For example, if correspondingly designed, the difference between the intensity of sunlight incident upon the image sensor device 52 and the intensity of light from the target area 18 incident upon the image sensor device 52 can be significantly reduced.

The aim of aligning or adjusting the mirror device 24 of a heliostat 23 is for the first angle 40 and the second angle 46 to be identical. In accordance with the invention, the automatic control (regulation) is carried out using the image sensor device 52 by means of an image recognition device 64 of the control device 28:

The intensity and/or contour of the image 54 of the sun 22 is or are detected by the image sensor device 52, and a corresponding evaluation is carried out by the control device 28. A check is carried out as to whether there is a sufficiently large signal strength to carry out an automatic control procedure using the image 54. If this is not the case, because, in particular, the sun 22 is covered by clouds, the control device 28 then transfers to a non-automatic control mode.

The control device 28 includes a device 66 serving to calculate the position of the sun from known algorithms of the sun's movement and/or a required position of the mirror device 24. For example, the expected position of the sun is calculated from the calendar date and the time of day using the known algorithms. A "virtual" image is then generated by means of this calculated position of the sun. This is compared with the detected image 56 of the target area 18. In principle, the comparison is carried out as described hereinbelow.

To achieve a (rough) non-automatic control of the adjusting movement of the mirror device 24 when clouds pass by, it may be alternatively or additionally provided that the required position of the mirror device 24 is determined. This is, for example, possible by calculating the speed of the first drive motor 36 and the second drive motor 38. It may also be provided that by means of the actual time of day the required position of the mirror device 24 is calculated and used as controlled variable.

In order to obtain a clear image 56 of the target area 18, it may be provided that the receiver 12 comprises one or more passive and/or active markings 68. Such a marking 68 may, for example, be formed by an at least partial border of the target area 18, this border being of bright configuration in comparison with the remaining absorption area of the target area 18.

It is also possible for a marking to be formed by one or more light-emitting elements 69, which are arranged at or in the proximity of the target area 18 of the receiver 12. For example, such a light-emitting element 69 is formed by a strong lamp emitting on a very narrow band. Only the correspondingly narrow wavelength band is then used at the image sensor device 52. The difference between the intensity of the sunlight and the light originating from the target area 18 of the receiver 12 can thereby be reduced.

If the control device 28 detects that the automatic control of the adjustment of the mirror device 24 is possible using the image 54, then the control device 28 is operated in an automatic control mode. During performance of the non-automatic control mode, a check is constantly made as to whether the image 54 is suitable for transferring from the non-automatic control mode to the automatic control mode. In a corresponding manner, a check is constantly made in the automatic control mode as to whether the image 54 is suitable for possibly transferring to the non-automatic control mode.

The image sensor device 52 is operated in such a way that a first imaging of the sun 22 is performed with a limited exposure time and a second imaging of the target area 18 is performed with a limited exposure time. The control device 28 includes a corresponding device 70 for controlling the imaging time. This controlling of the imaging time is carried out in both the non-automatic control mode and the automatic control mode. The first imaging and the second imaging take place in succession, and the imaging of the sun 22 may take place before or after the imaging of the target area 18.

In particular, it is provided that the exposure time for imaging the sun 22 is shorter than the exposure time for imaging the target area 18. The different exposure time can be set by forming an image of the target area 18 and of the sun 22 with a time interval between these, so as to obtain optimized results.

Figure 4A:
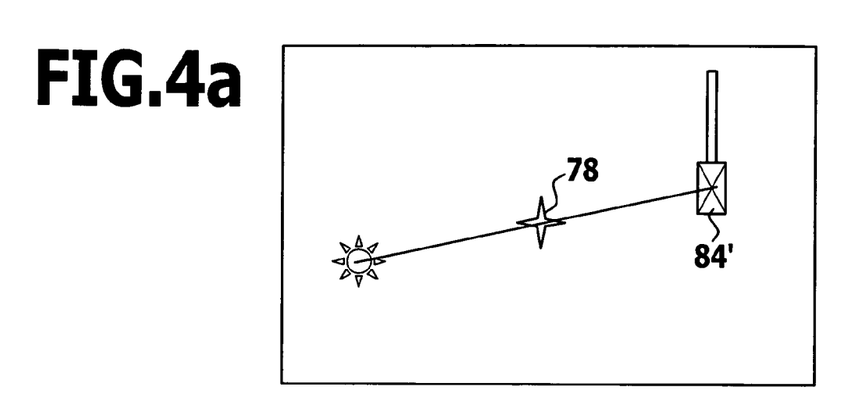
FIG. 4(a) shows a calibrating procedure.
Figure 4B:
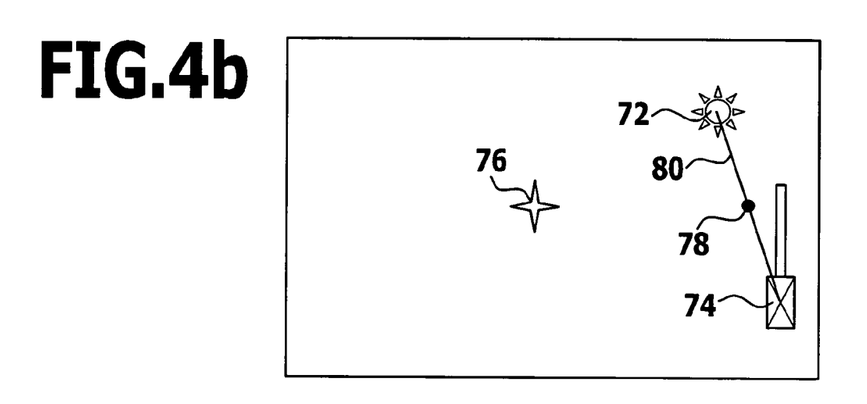
FIG. 4(b) shows an incorrect alignment and FIG. 4(c) shows a correct alignment of a mirror device of a heliostat.

The image sensor device 52 supplies an image which is evaluated by the image recognition device 64 of the control device 28. The image recognition device 64 determines the coordinates of the image of the sun 22 and the image of the target area 18. FIG. 4(b) shows diagrammatically a picture with an image 72 of the sun and an image 74 of the target area 18.

A controlled variable is, in particular, the position of the images 72 and 74 relative to an image 76 of the prescribed vector 44. If the image sensor device 52 is correspondingly arranged on the mirror surface 26, the image 76 is spatially fixed independently of the position of the mirror device 24.

It is provided that a control variable is the position of a midpoint 78 of a connecting line 80 between the image 72 of the sun and the image 74 of the target area 18. The midpoint 78 as control target should always lie at the same position and, in particular, lie at the image 76 of the prescribed vector 44. (The image 76 does not have to be a real picture, but can also be prescribed by corresponding coordinates.)

In the example shown in FIG. 4(b), the heliostat 23 with its mirror surface 26 is not aligned correctly, since the midpoint 78 does not lie at the image 76.

It is then determined from the position of the midpoint 78 how the heliostat 23 with the mirror device 24 is to be adjusted. The control device 28 actuates the drive device 34 correspondingly. During this adjusting procedure, it is possible to check during interruptions where the midpoint 78 lies. For example, the adjusting procedure is performed stepwise, with checking of the controlled variable being carried out between non-movement phases of the mirror device 24.

Figure 4C:
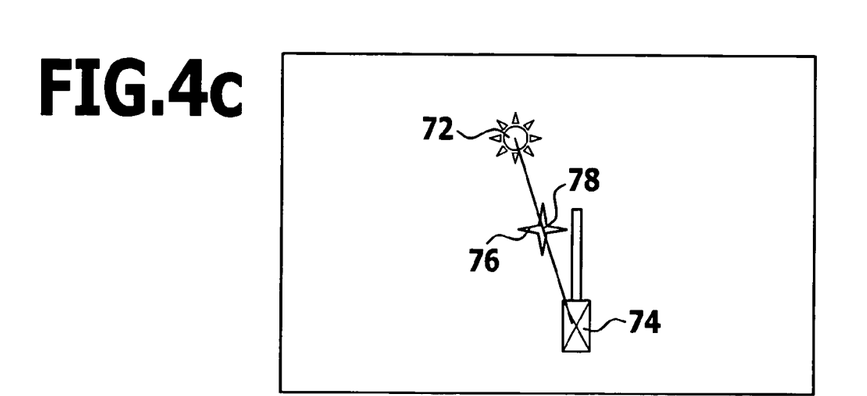

FIG. 4(c) shows an example in which the midpoint 74 as controlled variable lies at the correct position, namely at the image 76. Here the mirror device 24 is correctly aligned. This position is the control target.

A calibration of the heliostat 23 with the image sensor device 52 is carried out before performing the automatic control procedure. For this purpose, for example, a marking 82 is arranged in the proximity of the target area 18. The marking comprises, for example, white reference surfaces. These are, for example, in the form of spaced marking bars suitable for image recognition.

A target point of the mirror device 24, which, in particular, is determined by the prescribed vector 44, is aligned with the marking 82. (The marking 82 thus forms a target area 84 for the calibration.)

The position of a focal spot as center of the radiation flux density distribution onto the target area 84 and the center of the image of the sun 22 in the images of the image sensor device 52 are then determined. From these coordinates, the position of the midpoint 78 or of the image 76 is then determined. This is indicated diagrammatically in FIG. 4(a). Herein the image of the target area 84 is indicated by reference numeral 84'. The corresponding coordinates are stored.

It is possible for further calibrating procedures to be performed for different angles of incidence; the corresponding calibration results are stored and taken into consideration by the image recognition device 64 when the image is evaluated in the non-automatic control mode or automatic control mode.

The image sensor device 52 can be used as camera during the calibration.

The image sensor device 52 can be implemented in a simple and cost-effective way. It is, in principle, possible for the image sensor device 52 and the control device 28 or at least parts thereof (such as, for example, the image recognition device 64) to be implemented on a single chip.

The solution according to the invention can be implemented in a simple and cost-effective way. The possibilities of errors in the calibration can be minimized. The calibration can be carried out in a simple way. The automatic control of the alignment or adjustment of the mirror device 24 can be carried out with a high degree of precision. A calibration procedure may possibly only have to be carried out once. The image sensor device 52 may be used as camera for the calibration, so that no additional camera is required. Furthermore, data exchange is facilitated during the calibration.

An additional system for aligning/adjusting the mirror device 24 is not required when clouds pass by. By calculating the position of the sun, an optimized adjustment is also possible when clouds pass by.

In the solution according to the invention, there is no requirement for an angle transducer at a respective axis 30, 32 for determining the actual position of the mirror device 24 of a heliostat. The actual position can be determined in a simple way by the image sensor device 52 and the corresponding image recognition.

It is also possible for markers to be arranged not only on the receiver 12 but also at further known positions in a heliostat field. For example, markers are arranged on pylons of adjacent heliostat devices 20. The aperture angle for the image sensor device 52 can thereby be kept small. In turn, it is possible to use an image sensor device 52 with a lower resolution (smaller number of pixels). In the course of the day, a "moving along" from marker to marker can be enabled by the automatic control mode.

The invention claimed is:

1. Method for automatically controlling alignment of a heliostat with respect to a receiver, the method comprising:
   providing a two-dimensional image sensor device in surface-to-surface contact on a mirror surface of a mirror device of the heliostat;
   determining two-dimensional images which are formed of the sun and of a prescribed target area of the receiver;
   determining positions of the two-dimensional images relative to a prescribed vector of the mirror device; and
   aligning the heliostat by the two-dimensional image sensor device using image recognition on the two-dimensional images in such a way that a first angle of a first vector pointing towards the sun, relative to the prescribed vector of the mirror device, and a second angle of a second vector pointing towards the prescribed target area of the receiver, relative to the prescribed vector, are in a relationship to each other which is dependent upon the prescribed vector of the mirror device; wherein:
   the prescribed vector of the mirror device is a normal vector to a mirror surface; and the heliostat is so aligned that the first angle and the second angle are substantially identical.

2. Method in accordance with claim 1, wherein an optical imaging device is associated with the two-dimensional image sensor device.

3. Method in accordance with claim 2, wherein the optical imaging device has a spectrally selective characteristic.

4. Method in accordance with claim 2, wherein the optical imaging device comprises at least one aperture.

5. Method in accordance with claim 2, wherein the optical imaging device comprises a plurality of partial imaging devices for respectively imaging a partial angle area.

6. Method in accordance with claim 5, wherein a partial imaging device is designed so as to enable the two-dimensional image sensor device to recognize whether the partial imaging device is active or not.

7. Method in accordance with claim 1, wherein the two-dimensional image sensor device is arranged and designed such that the sun and the prescribed target area are imaged in all relevant operating points.

8. Method in accordance with claim 1, wherein the two-dimensional image sensor device is fixedly positioned in a central area of the mirror surface of the mirror device.

9. Method in accordance with claim 1, wherein one or more markings for the image recognition by the two-dimensional image sensor device are positioned on at least one of the receiver and a heliostat field.

10. Method in accordance with claim 9, wherein the one or more markings are formed using at least one of passive and active elements.

11. Method in accordance with claim 9, wherein the one or more markings are formed by a bright, at least partial border on the prescribed target area of the receiver.

12. Method in accordance with claim 9, wherein the one or more markings are formed by one or more active light-emitting elements.

13. Method in accordance with claim 1, wherein a first forming of an image for the sun and a second forming of an image for the receiver are performed with the two-dimensional image sensor device.

14. Method in accordance with claim 13, wherein the first forming of an image and the second forming of an image are performed with a time interval therebetween.

15. Method in accordance with claim 13, wherein the first forming of an image is performed with a shorter exposure time than the second forming of an image.

16. Method in accordance with claim 1, wherein a controlled variable is the position of the image of the sun and of the image of the target area of the receiver relative to the prescribed vector.

17. Method in accordance with claim 16, wherein a controlled variable is the position of a certain point on a connecting line between an image of the sun and an image of the target area of the receiver.

18. Method in accordance with claim 17, wherein the automatic control is carried out such that the certain point lies on a prescribed image curve or at a prescribed image point.

19. Method in accordance with claim 17, wherein the certain point is a midpoint of the connecting line.

20. Method in accordance with claim 19, wherein the automatic control is carried out such that the midpoint lies substantially at the same position in an image of the prescribed vector.

21. Method in accordance with claim 1, wherein an adjustment position for the mirror device is determined from a deviation of a controlled variable from a required value.

22. Method in accordance with claim 1, wherein at least one of a position of the sun and a required position for the mirror device is calculated by a non-automatic control mode.

23. Method in accordance with claim 22, wherein the images of the target area of the receiver are determined in an automatic control mode, and at least one of the calculated position of the sun and the calculated required position for the mirror device is used for the adjustment of the mirror device.

24. Method in accordance with claim 1, wherein at least one of an intensity and a contour of an image of the sun is measured in order to check whether the automatic control of the alignment of the mirror device is possible using the image of the sun.

25. Method in accordance with claim 1, wherein coordinates of an image associated with the prescribed vector of the mirror device are determined by a calibration procedure.

26. Heliostat device, comprising:
a movable mirror device;
a two-dimensional image sensor device arranged in surface-to-surface contact on a mirror surface of the mirror device;
an optical imaging device associated with the two-dimensional image sensor device; and
a control device including an image recognition device;
the mirror device being alignable by the two-dimensional image sensor device and the control device using image recognition of a two-dimensional image of the sun and a two-dimensional image of a prescribed target area of a receiver;
said control device being adapted to perform the steps:
determining the two-dimensional images which are formed of the sun and the prescribed target area of the receiver;
determining positions of the two-dimensional images relative to a prescribed vector of the mirror device; and
aligning the heliostat by the two-dimensional image sensor device using image recognition on the two-dimensional images in such a way that a first angle of a first vector pointing towards the sun, relative to the prescribed vector of the mirror device, and a second angle of a second vector pointing towards the prescribed target area of the receiver, relative to the prescribed vector, are in a relationship to each other which is dependent upon the prescribed vector of the mirror device; wherein:
the prescribed vector of the mirror device is a normal vector to a mirror surface; and the heliostat is so aligned that the first angle and the second angle are substantially identical.

27. Heliostat device in accordance with claim 26, wherein the mirror device is rotatable about at least two axes.

28. Heliostat device in accordance with claim 26, further comprising a drive device for moving the mirror device.

29. Heliostat device in accordance with claim 26, wherein the two-dimensional image sensor device has a normal direction which is parallel to a normal direction of a mirror surface of the mirror device.

30. Heliostat device in accordance with claim 26, wherein an optical imaging device is associated with the two-dimensional image sensor device.

31. Heliostat device in accordance with claim 30, wherein the optical imaging device has a spectrally selective characteristic.

32. Heliostat device in accordance with claim 30, wherein the optical imaging device has at least one aperture.

33. Heliostat device in accordance with claim 30, wherein the optical imaging device has a plurality of partial imaging devices for respectively forming images of partial angle areas.

34. Heliostat device in accordance with claim 26, wherein the two-dimensional image sensor device is arranged and designed so as to enable images of the sun and the prescribed target area of the receiver to be formed in all relevant operating points.

35. Heliostat device in accordance with claim 34, wherein the two-dimensional image sensor device is fixedly positioned in a central area of the mirror surface of the mirror device.

36. Heliostat device in accordance with claim 26, wherein the control device includes a device for calculating at least one of the position of the sun and a required position for the mirror device.

37. Heliostat device in accordance with claim 26, wherein the control device includes a device for controlling an imaging time for the sun and the target area of the receiver.

38. Solar power plant, comprising:
at least one receiver; and
at least one heliostat device by means of which solar radiation is directable onto the at least one receiver;
wherein the at least one heliostat device comprises:
a movable mirror device;
a two-dimensional image sensor device arranged in surface-to-surface contact on a mirror surface of the mirror device;
an optical imaging device associated with the two-dimensional image sensor device; and
a control device including an image recognition device;
wherein:
two-dimensional images of the sun and a prescribed target area of a receiver are determined;
positions of the two-dimensional images relative to a prescribed vector of the mirror device are determined;
the mirror device is alignable by the two-dimensional image sensor device and the control device using image recognition of the two-dimensional image of the sun and the two-dimensional image of the target area of the receiver;
the prescribed vector of the mirror device is a normal vector to a mirror surface; and the heliostat is so aligned that a first angle of a first vector pointing toward the sun and a second angle of a second vector pointing toward the prescribed target area of the receiver are substantially identical.

39. Solar power plant in accordance with claim 38, wherein at least one of the at least one receiver and a heliostat field comprises one or more markings for the image recognition by the two-dimensional image sensor device on the at least one heliostat device.

40. Solar power plant in accordance with claim 39, wherein the one or more markings are formed by a bright, at least partial border on the target area of the receiver.

41. Solar power plant in accordance with claim 38, wherein the at least one receiver has one or more markings for a calibration of the heliostat device.

42. Solar power plant in accordance with claim 38, wherein the at least one receiver is a tower receiver.

* * * * *